United States Patent Office 3,145,193
Patented Aug. 18, 1964

3,145,193
POLYAMIDES FROM A MIXTURE OF ISO-PHTHALIC ACID, TEREPHTHALIC ACID AND BRANCHED CHAIN ALIPHATIC DI-AMINE
Rudolf Gabler, Zollikerberg, Zurich, Switzerland, assignor to W. R. Grace & Co., Cambridge, Mass., a corporation of Connecticut
No Drawing. Filed June 30, 1961, Ser. No. 120,944
Claims priority, application Switzerland Oct. 29, 1959
10 Claims. (Cl. 260—78)

This invention relates to synthetic linear polyamides and particularly to a group of polyamides which are transparent, thermoplastic and characterized by a high degree of swelling in certain organic liquids. The new polyamides of my invention cannot be drawn to form useful textile fibers but are easily moldable by injection or vacuum molding techniques or by extrusion, to form a large variety of useful shaped articles. In addition, because of their ability to swell and become liquefied in polar organic solvents, the new polyamides of my invention may be used in coatings or adhesives, or may be cast into clear, tough, transparent films.

Linear polyamides have been made in the past by condensing isophthalic acid or terephthalic acid with polymethylenediamines, usually those containing at least six carbon atoms in the main hydrocarbon chain of the diamine. Although polyamides may be formed using the straight chain polymethylenediamines, these polymers have such high melting points that they are of no practical use, either in fiber production or in normal molding procedures. The introduction of side chains by aliphatic substitution of the main hydrocarbon chain of the diamine has been found both to lower the melting points and to confer other desirable characteristics on the resulting polyamides.

Linear fiber-forming polyamides suitable for use in the manufacture of tire cords have been made by condensing terephthalic acid with polymethylenediamines having from six to eight carbon atoms in the hydrocarbon chain and substituted by one, or at the most two, methyl groups. These polyamides, which are described in U.S. Patent No. 2,752,328, are typical nylon polymers, being opaque, highly crystalline, easily drawn to form useful fibers, and melting over a narrow temperature range.

Polyamides of radically different properties from the fiber-forming nylons described above may be made by condensing isophthalic or terephthalic acid or mixtures thereof with a hexamethylenediamine containing at least three side chain carbon atoms introduced by alkyl substitution of the main hydrocarbon chain, as described in my copending application filed on an even date herewith. The alkyl substitution may be in the form of one or more alkyl groups, and the total number of side chain carbon atoms may vary from three to as many as eighteen. The most striking property of the polyamides described in my copending application is their transparent, glass clear appearance. They soften gradually over a wide temperature range, usually about 20 to 40 degrees centigrade, are not only soluble in typical polyamide solvents but also swell extensively in the lower alcohols, for example, methanol, ethanol, and isopropanol, to give honeylike pourable masses suitable for coating and adhesive applications. They have excellent tensile strength, impact resistance, and flexibility. Unlike conventional polyamides, however, they have a very low capacity for elongation. This property, together with their completely amorphous nature, makes the above-described polyamides unsuitable for the production of artificial textile fibers.

The polyterephthalamides of the alkyl-substituted hexamethylenediamines described above have considerably higher melting points than the corresponding isophthalic acid derivatives, the difference being between 50 and 100 degrees centigrade. The two types of homopolymers are quite similar in their clear, transparent appearance and in their behavior toward solvents, but vary to some extent in their mechanical properties, the terephthalamides in general being somewhat superior in tensile strength, impact resistance etc. to the corresponding isophthalamides. Polyamides made from mixtures of the two acids are also clear and transparent; their melting points and mechanical properties vary between those of the polymers made from the pure acids.

I have discovered that polyamides of high quality may be made by condensing substantially equimolar proportions of certain alkyl-substituted polymethylenediamines with terephthalic acid containing only a small amount of isophthalic acid, preferably not more than about 5 or 10 percent. These mixed polyamides melt at temperatures only slightly lower than do the corresponding terephthalamide polymers, and the optical and mechanical properties of the two classes of polyamides are indistinguishable. This discovery is most unexpected, since ordinarily the use of even a small amount of a second acid in the preparation of superpolyamides results in products which have much lower melting points and much less desirable mechanical properties than the corresponding polyamide made from the pure acid alone.

Diamines which are suitable for the polycondensation reaction with the mixed terephthalic-isophthalic acid will contain at least seven methylene groups, generally from seven to ten, in the main chain and up to 18 carbon atoms in one or several side chains introduced by the alkyl substitution of the main hydrocarbon chain. In the preferred form of my invention, the diamines contain at least three side chain carbon atoms, and the resulting polyamides are transparent, glass clear, moldable and exhibit a high degree of swelling in the lower alcohols. Suitable alkyl-substituted diamines are, for example, 2 - methyl - 4 - ethylheptamethylenediamine; 2-ethyl - 4 - methylheptamethylenediamine; 2,2,5,5 - tetramethylheptamethylenediamine; 3 - isopropylheptamethylenediamine; 3 - isooctylheptamethylenediamine; 3,3,5 - trimethyloctamethylenediamine; and 2,4 - diethyloctamethylenediamine.

My invention is of particular advantage in manufacturing polyterephthalamides because it enables me to use the less expensive grades of terephthalic acid in which a small proportion of isophthalic acid is present as an impurity. Terephthalic acid is often produced from p-xylene, or alternatively it may be made by the isomerization of o-phthalic acid. In both these processes, it is difficult to avoid the presence of a small amount of isophthalic acid. Since a considerable portion of the cost of high purity terephthalic acid is due to the tedious and costly procedures which are necessary in order to remove m-isomers either from the raw material or from the final product, a terephthalic acid which contains a few percent of isophthalic acid will, of course, be much less expensive than the 100 percent p-isomer.

My invention will be more clearly understood by reference to the following examples, in which all parts shown are by weight.

*Example I*

16.6 parts of a mixed acid containing 95 percent of terephthalic and 5 percent of isophthalic acid were mixed with 30 ml. water and brought almost to boiling on a steam bath. By means of a dropper funnel, a solution of 18.0 parts of 2-methyl-4-ethylheptamethylene diamine in 50 ml. alcohol was slowly added dropwise; this finally resulted in the complete solution of the acid. After cooling, the salt of the mixed acid and the substituted heptamethylenediamine precipitated out as colorless crystals; the yield was 90 percent.

A mixture of 300 g. of the above salt, 100 ml. water and 0.5 g. of glacial acetic acid was heated to 140° C. with constant agitation and exclusion of air in a 1 liter dissolving vessel of a stainless steel autoclave also having a capacity of 1 liter, resulting in the total solution of the salt. With the aid of pure nitrogen, the solution was passed through a filter into the autoclave which had been preheated to 250° C. This resulted in a drop in temperature within the autoclave to 160 to 180° C. When the heat was turned on, the pressure and temperature rose rapidly. Water vapor was released by opening the valve in the cover so that pressure equalization with atmospheric pressure was obtained at approximately the same time that an inside temperature of 250° C. was reached.

The melt was now heated without pressure to a temperature of 280° C. over a period of 3½ hours. The temperature was held at this point for 2 hours more and then the melt was extruded into cold water by means of nitrogen pressure, so as to form cylindrical rods. The polymer was transparent, melted over the range of 120 to 130° C. and had an intrinsic viscosity of 0.98.

*Example II*

The process of Example I was carried out with an acid mixture containing 90 percent terephthalic acid and 10 percent isophthalic acid and the same diamine. The resulting polymer was clear and transparent, melted over a range of 110 to 120° C. and had an intrinsic viscosity of 0.98.

The polyamides prepared according to Examples I and II were compared with a series of supercondensation polymers made with the same diamine, and with acid mixtures varying from 100 percent terephthalic acid to 100 percent isophthalic acid. The polyamide from 100 percent terephthalic acid melted over a range of 130 to 140° C., that from 100 percent isophthalic acid had a melting range of 80 to 90° C. The mechanical properties of the pure terephthalamide were somewhat superior to those of the isophthalamide polymer. The melting points of the polyamides made from acids of intermediate compositions did not go through a eutectic point, as would normally be expected, but dropped rather sharply with the addition of the first 20 percent of isomeric acid to a melting range of 100 to 110° C., and then fell more gradually over the rest of the range of admixtures, to the melting point of the 100 percent isophthalic acid polymer. All the intermediate polymers were clear and transparent, like those of the pure acids. The mechanical properties of the polymers made according to Examples I and II were indistinguishable from the properties of the pure terephthalamide. The use of larger amounts of isophthalic acid, however, brought about a noticeable deterioration of the various mechanical properties such as tensile strength, impact resistance, flexural strength, etc., causing these properties to approach those of the somewhat less desirable polyisophthalamide polymer.

*Example III*

The process of Example I was carried out, using 16.6 parts by weight of a mixed acid containing 90 percent of terephthalic acid and 10 percent isophthalic acid, and 19.5 parts by weight of 3,3,5-trimethyloctamethylenediamine in the preparation of the salt. The polyamide which was formed in the condensation step was transparent, glass clear, melted over a range of 140 to 150° C. and had an intrinsic viscosity of 0.76. Films having a particularly high degree of flexibility could be formed from the polymer of this example.

*Example IV*

The process of Examppple I was carried out, using 16.6 parts by weight of a mixed acid containing 90 percent of terephthalic acid and 10 percent of isophpthalic acid, and 21.0 parts by weight of 2,4-diethyloctamethylenediamine in the preparation of the salt. The polyamide which was formed in the condensation step was transparent, glass clear, melted over a range of 120 to 140° C. and had an intrinsic viscosity of 0.65. Like the polyamide of the previous example, it was suitable for the production of flexible films.

The polyamides made according to the above examples are characterized by their glass clear, transparent appearance, by their completely amorphous nature, by softening gradually over a wide temperature range, by high tensile strength, impact resistance and flexibility and by a room temperature elongation at break of less than 10 percent. This property, together with their completely amorphous nature, makes the polyamides of my invention unsuitable for the production of artificial textile fibers. The polyamides of the above examples, furthermore, exhibit a high degree of swelling in the lower alcohols and are soluble in solvent mixtures containing 80 parts by volume of chloroform and 20 parts by volume of methanol. They have been found to be highly useful in the production of molded goods, sheets, and films, as well as for coating and adhesive applications.

This application is a continuation-in-part of my co-pending application, Serial No. 64,713, filed October 25, 1960, now abandoned.

I claim:
1. A process for producing a linear, amorphous, film-forming polyamide which comprises condensing substantially equimolar amounts of an acid mixture of 90 to 95 percent terephthalic acid and 5 to 10 percent isophthalic acid with an aliphatic polymethylene diamine selected from the group consisting of 2-methyl-4-ethylheptamethylenediamine; 2-ethyl-4-methylheptamethylenediamine; 2,2,5,5 - tetramethylheptamethylenediamine; 3 - isopropylheptamethylenediamine; 3 - isooctylheptamethylenediamine; 3,3,5 - trimethyloctamethylenediamine; and 2,4-diethyloctamethylenediamine.

2. A process for producing a linear, amorphous film-forming polyamide which comprises condensing substantially equimolar amounts of an acid mixture of 95 percent terephthalic acid and 5 percent isophthalic acid with 2-methyl-4-ethyl heptamethylenediamine.

3. A process for producing a linear, amorphous film-forming polyamide which comprises condensing substantially equimolar amounts of an acid mixture of 90% terephthalic acid and 10% isophthalic acid with 2-methyl-4-ethyl heptamethylenediamine.

4. A process for producing a linear, amorphous film-forming polyamide which comprises condensing substantially equimolar amounts of an acid mixture of 90% terephtalic acid and 10% isophthalic acid with 3,3,5-trimethyloctamethylenediamine.

5. A process for producing a linear, amorphous film-forming polyamide which comprises condensing substantially equimolar amounts of an acid mixture of 90% terephthalic acid and 10% isophthalic acid with 2,4-diethyl-octamethylenediamine.

6. The polyamide produced by the process of claim 1.
7. The polyamide produced by the process of claim 2.
8. The polyamide produced by the process of claim 3.
9. The polyamide produced by the process of claim 4.
10. The polyamide produced by the process of claim 5.

References Cited in the file of this patent

UNITED STATES PATENTS

| | | |
|---|---|---|
| 2,742,496 | Lum et al. | Apr. 17, 1956 |
| 2,752,328 | Magat | June 26, 1956 |
| 2,766,221 | Lum et al. | Oct. 9, 1956 |
| 2,864,807 | Nobis et al. | Dec. 16, 1958 |
| 2,902,475 | Burkhard | Sept. 1, 1959 |